(12) United States Patent
Kumar et al.

(10) Patent No.: US 11,307,907 B2
(45) Date of Patent: Apr. 19, 2022

(54) INFORMATION HANDLING SYSTEM AND METHOD TO AUTOMATICALLY SYNCHRONIZE OPERATING SYSTEM AND BOOT FIRMWARE LANGUAGES

(71) Applicant: DELL PRODUCTS L.P., Round Rock, TX (US)

(72) Inventors: Shubham Kumar, Chakradharpur (IN); Ibrahim Sayyed, Georgetown, TX (US); Manjunath Gr, Bangalore (IN); Debasish Nath, West Bengal (IN); Balasingh P. Samuel, Round Rock, TX (US); Michael W. Arms, Pflugerville, TX (US)

(73) Assignee: Dell Products L.P., Round Rockq, TX (US)

(*) Notice: Subject to any disclaimer, the term of this patent is extended or adjusted under 35 U.S.C. 154(b) by 124 days.

(21) Appl. No.: 16/780,053

(22) Filed: Feb. 3, 2020

(65) Prior Publication Data
US 2021/0240545 A1 Aug. 5, 2021

(51) Int. Cl.
*G06F 9/00* (2006.01)
*G06F 9/52* (2006.01)
*G06F 9/4401* (2018.01)

(52) U.S. Cl.
CPC .......... *G06F 9/52* (2013.01); *G06F 9/4406* (2013.01); *G06F 9/4401* (2013.01)

(58) Field of Classification Search
CPC ................................ G06F 9/52; G06F 9/4406
USPC .......................................................... 713/2
See application file for complete search history.

(56) References Cited

U.S. PATENT DOCUMENTS

| 6,252,589 B1* | 6/2001 | Rettig | G06F 9/454 |
| | | | 715/703 |
| 8,813,059 B2* | 8/2014 | Sasaki | G06F 8/65 |
| | | | 717/168 |
| 2002/0087588 A1* | 7/2002 | McBride | G06F 11/1464 |

(Continued)

OTHER PUBLICATIONS

Microsoft Docs, "Key Distribution Center", May 30, 2018, 5 pgs.
Whatis.com, "Kerberos", 2019, 5 pgs.
Windows, "Windows Platform Binary Table", Sep. 4, 2019, 12 pgs.

*Primary Examiner* — Volvick Derose
(74) *Attorney, Agent, or Firm* — Egan, Enders & Huston LLP.

(57) ABSTRACT

Information handling systems (IHS) and methods are provided to automatically synchronize operating system (OS) and boot firmware languages. In one embodiment, a method may detect a change in an active OS language from a first language pack to a second language pack, notify the boot firmware that the active OS language was changed, and provide an identity of the second language pack to the boot firmware during OS runtime. When the IHS is subsequently rebooted, the active boot firmware language may be synchronized to the active OS language. In another embodiment, the method may detect a change in an active boot firmware language from a first language pack to a second language pack, notify the OS that the active boot firmware language was changed, and provide an identity of the second language pack to the OS during a pre-boot phase. When the OS is subsequently booted, the active OS language may be synchronized to the active boot firmware language.

21 Claims, 7 Drawing Sheets

(56) References Cited

U.S. PATENT DOCUMENTS

| | | | |
|---|---|---|---|
| 2003/0046059 A1* | 3/2003 | Litster | G06F 9/454 704/8 |
| 2003/0046526 A1* | 3/2003 | Zhang | G06F 9/454 713/1 |
| 2003/0097555 A1* | 5/2003 | Cheston | G06F 9/454 713/2 |
| 2004/0236567 A1* | 11/2004 | Rothman | G06F 9/4401 704/8 |
| 2004/0249992 A1* | 12/2004 | Komarla | G06F 9/4411 710/8 |
| 2005/0060378 A1* | 3/2005 | Girard | G06F 40/58 709/206 |
| 2005/0144428 A1* | 6/2005 | Rothman | G06F 9/45512 713/1 |
| 2006/0075215 A1* | 4/2006 | Rawe | G06F 9/454 713/2 |
| 2006/0167831 A1* | 7/2006 | Kamppari | G06F 9/454 |
| 2007/0005679 A1* | 1/2007 | Bui | G06F 16/24564 709/201 |
| 2007/0245346 A1* | 10/2007 | Shintoku | G06F 9/454 717/174 |
| 2009/0193365 A1* | 7/2009 | Sugiura | G06F 3/0482 715/840 |
| 2010/0057440 A1* | 3/2010 | Springfield | G06F 9/454 704/8 |
| 2010/0070264 A1* | 3/2010 | Lee | G06F 8/61 704/8 |
| 2010/0265183 A1* | 10/2010 | Mail | G06F 3/04895 345/168 |
| 2013/0036210 A1* | 2/2013 | Birtwhistle | G16H 40/40 709/221 |
| 2016/0323482 A1* | 11/2016 | Chung | H04N 21/4333 |
| 2017/0169225 A1* | 6/2017 | Rajcan | H04L 67/306 |
| 2017/0289188 A1* | 10/2017 | Shaikh | H04L 61/2007 |
| 2018/0150302 A1* | 5/2018 | Chuang | G06F 21/575 |
| 2018/0278768 A1* | 9/2018 | Ono | G06F 8/61 |
| 2019/0191045 A1* | 6/2019 | Ikeda | H04N 1/00498 |

* cited by examiner

INFORMATION HANDLING SYSTEM AND METHOD TO AUTOMATICALLY SYNCHRONIZE OPERATING SYSTEM AND BOOT FIRMWARE LANGUAGES

FIELD

This invention relates generally to information handling systems (IHSs), and more particularly, to hardware, software and/or firmware components of an IHS and related methods for automatically synchronizing operating system and boot firmware languages.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems (IHSs) typically include a boot system such as, for example, a Basic Input/Output System (BIOS) or Unified Extensible Firmware Interface (UEFI). The boot system code is generally implemented as boot firmware, which is stored in non-volatile memory, such as read only memory (ROM), non-volatile random access memory (NVRAM) and/or Flash memory. Upon system start-up or reboot, a processing device (such as a central processing device and/or an embedded controller) may execute program instructions within the boot firmware to test and initialize the IHS hardware components, perform a Power-On Self-Test (POST) to ensure the hardware configuration is valid and working properly, and load an operating system (OS) from a computer readable storage device into system memory. Additional boot services may also be available for execution when the boot firmware owns the system platform during a pre-boot phase before the OS is loaded and running. Once the OS assumes control of the system platform, the boot system may continue to provide runtime services for the operating system and other application programs executed in the OS environment.

The boot system, operating system and application programs each provide visual information to the user (e.g., in the form of messages, prompts and graphical user interfaces), which may be displayed using a default language that was set during manufacturing, or a language selected by a user during the first system boot or sometime thereafter. However, the boot system and operating system use separate setup menus for manually selecting the languages to be used in the pre-boot and OS environments. In Windows® operating systems, for example, a user may change the language used in the OS environment by selecting a different language in the Language settings menu of the Settings app (or Control Panel). To change the language used in the pre-boot environment, the user may access and select a different language in the BIOS setup menu (F2).

In order to support global markets, information handling systems are generally provisioned at the factory with multi-language support. Before an information handling system (IHS) is shipped to a customer, for example, a plurality of language packs may be stored within a computer readable storage device (e.g., a hard disk drive, HDD) to provide multi-language support for the operating system and all OS-based software and firmware components (e.g., OS-based application programs, services, drivers, etc.). A significantly smaller number of language packs may be stored within non-volatile memory (e.g., a Flash memory device) to provide multi-language support for the boot system and services. When a new language is selected in the OS environment (or the pre-boot environment), the language pack corresponding to the newly selected language is obtained from computer readable storage device (or the non-volatile memory) and used to display visual information to the user. However, language changes made in the OS environment are not reflected in the pre-boot environment (and vice versa).

In other words, conventional information handling systems fail to automatically synchronize operating system and boot firmware languages. When a user changes the language in the OS environment, the language change is not propagated to, or adopted by, the boot system components. In order to change the language in the pre-boot environment, the user must navigate through and manually select the desired language in the BIOS setup menu. There are many problems associated with this process.

First, changing the language selection in the BIOS setup menu is a manual process, which many users are not entirely comfortable with. If the user does not fully understand the language currently used to display information in the pre-boot environment, the user may be unable to make the desired language change in the BIOS setup menu. Second, the number of languages available within the BIOS setup menu is generally limited to a relatively small number (e.g., about 1 to 3) of language packs due to size constraints placed on the non-volatile memory. If a user desires a language, which is not supported by the small number of language packs stored within the non-volatile memory, a full BIOS update is generally needed to update the language packs stored therein. It is known that an over the air firmware update may be performed in the pre-boot environment to update the BIOS. It is also known that zipped BIOS contents may be stored within an EFI system partition (ESP) of the computer readable storage device in an RCV file. In some cases, the BIOS may use an RCV extractor to securely extract the zipped BIOS contents from the RCV file stored in the ESP partition.

SUMMARY OF THE INVENTION

The following description of various embodiments of information handling systems and related methods is not to be construed in any way as limiting the subject matter of the appended claims.

According to various embodiments of the present disclosure, information handling systems and methods are provided herein to automatically synchronize operating system and boot firmware languages. More specifically, information handling systems and methods are provided herein to automatically change the language used in the pre-boot environment when a language change is detected in the OS environment (and vice versa).

According to one embodiment, an information handling system (IHS) in accordance with the present disclosure may generally include a computer readable non-volatile memory, a computer readable storage device and a processing device. The computer readable non-volatile memory may be configured to store boot firmware, a language pack database containing a relatively small number of language packs configured to provide multi-language support for the boot firmware, and a pre-boot agent. The computer readable storage device may be configured to store an operating system (OS), a language pack database containing a relatively large number of language packs configured to provide multi-language support for the OS, and an OS agent. The processing device may be configured to execute the OS agent during OS runtime to detect a change in an active OS language and notify the boot firmware that the active OS language was changed, and may be configured to execute the pre-boot agent when the IHS is subsequently rebooted to synchronize an active boot firmware language to the active OS language.

In some embodiments, the processing device may be configured to execute the OS agent during OS runtime to detect a change in the active OS language from a first language pack to a second language pack, and provide an identity of the second language pack to the boot firmware. If the second language pack is not contained within the language pack database stored within the computer readable storage device, the processing device may be further configured to execute the OS agent to retrieve a copy of the second language pack from a remotely located system, and store the retrieved copy of the second language pack within the computer readable storage device.

To notify the boot firmware that the active OS language was changed, the processing device may execute the OS agent, in some embodiments, to send a notification message containing the identity of the second language pack to the boot firmware. In other embodiments, the processing device may execute the OS agent to store the identity of the second language pack as a non-volatile memory variable, which can read by the boot firmware at the next system boot, to notify the boot firmware that the active OS language was changed.

If the boot firmware receives notification that the active OS language was changed, the processing device may be configured to execute the pre-boot agent to obtain the identity of the second language pack, and determine if the active boot firmware language matches the identity of the second language pack. If the active boot firmware language does not match the identity of the second language pack, the processing device may be configured to execute the pre-boot agent to determine if a language pack matching the identity of the second language pack is contained within the language pack database stored within the computer readable non-volatile memory or the language pack database stored within the computer readable storage device.

If a language pack matching the identity of the second language pack is contained within the language pack database stored within the computer readable non-volatile memory, the processing device may be configured to execute the pre-boot agent to change the active boot firmware language to the language pack matching the identity of the second language pack.

If a language pack matching the identity of the second language pack is not contained within the language pack database stored within the computer readable non-volatile memory but is contained with the language pack database stored within the computer readable storage device, the processing device may be configured to execute the pre-boot agent to copy the language pack from the computer readable storage device to the computer readable non-volatile memory, and change the active boot firmware language to the language pack matching the identity of the second language pack.

In some embodiments, the processing device may be configured to execute the pre-boot agent during a pre-boot phase to detect a change in the active boot firmware language from a first language pack to a second language pack, notify the OS that the active boot firmware language was changed, and provide an identity of the second language pack to the OS. In such embodiments, the processing device may be configured to execute the OS agent when the OS is subsequently booted to synchronize the active OS language to the active boot firmware language.

In some embodiments, the processing device may execute the pre-boot agent to create and store a Windows Platform Binary Table (WPBT) Advanced Configuration and Power Interface (ACPI) table to notify the OS that the active boot firmware language was changed. The WPBT ACPI table may include a signed platform executable binary containing program instructions and the identity of the second language pack. If the OS receives notification that the active boot firmware language was changed, the processing device may execute the signed platform executable binary to obtain the identity of the second language pack, and change the active OS language to a language pack matching the identity of the second language pack.

According to another embodiment, a computer-implemented method is provided herein to synchronize operating system and boot firmware languages. The computer-implemented method may be performed by a processing device of an information handling system (IHS) executing program instructions, such as program instructions contained within the pre-boot agent, OS agent, WPBT ACPI table, etc. mentioned above. The computer-implemented method may generally include detecting a change in an active OS language from a first language pack to a second language pack during OS runtime, notifying the boot firmware that the active OS language was changed, providing an identity of the second language pack to the boot firmware, and synchronizing an active boot firmware language to the active OS language when the IHS is subsequently rebooted.

In some embodiments, computer-implemented method may include determining if the second language pack is stored within a computer readable storage device of the IHS prior to notifying the boot firmware that the active OS language was changed. If the second language pack is not stored within the computer readable storage device, the computer-implemented method may further include retrieving a copy of the second language pack from a remotely located system, and storing the retrieved copy of the second language pack within the computer readable storage device.

In some embodiments, the active boot firmware language may be synchronized to the active OS language by obtaining the identity of the second language pack, and determining if the active boot firmware language matches the identity of the second language pack. If the active boot firmware language does not match the identity of the second language pack, the computer-implemented method may include determining if a language pack matching the identity of the second language pack is stored within a computer readable non-volatile memory or a computer readable storage device of the IHS.

If a language pack matching the identity of the second language pack is stored with the computer readable non-volatile memory, the computer-implemented method may include changing the active boot firmware language to the language pack matching the identity of the second language pack.

If a language pack matching the identity of the second language pack is not stored within the computer readable non-volatile memory, but is stored within the computer readable storage device, the computer-implemented method may include performing a partial boot firmware update to copy the language pack from the computer readable storage device to the computer readable non-volatile memory, and changing the active boot firmware language to the language pack matching the identity of the second language pack.

According to another embodiment, a computer-implemented method performed by a processing device of an information handling system (IHS) to synchronize operating system and boot firmware languages. The computer-implemented method may be performed by a processing device of an information handling system (IHS) executing program instructions, such as program instructions contained within the pre-boot agent, OS agent, WPBT ACPI table, etc. mentioned above. The computer-implemented method may generally include detecting a change in an active boot firmware language from a first language pack to a second language pack during a pre-boot phase, notifying the OS that the active boot firmware language was changed, providing an identity of the second language pack to the OS, and synchronizing an active OS language to the active boot firmware language when the OS is subsequently booted.

In some embodiments, the computer-implemented method may include creating and storing a WPBT ACPI table to notify the OS that the active boot firmware language was changed. The WPBT ACPI table may include a signed platform executable binary containing program instructions and the identity of the second language pack. In some embodiments, the active OS language may be synchronized to the active boot firmware language by obtaining the identity of the second language pack from the WPBT ACPI table, and changing the active OS language to a language pack matching the identity of the second language pack.

BRIEF DESCRIPTION OF THE DRAWINGS

Other advantages of the present disclosure will become apparent upon reading the following detailed description and upon reference to the accompanying drawings in which.

Figure 1:
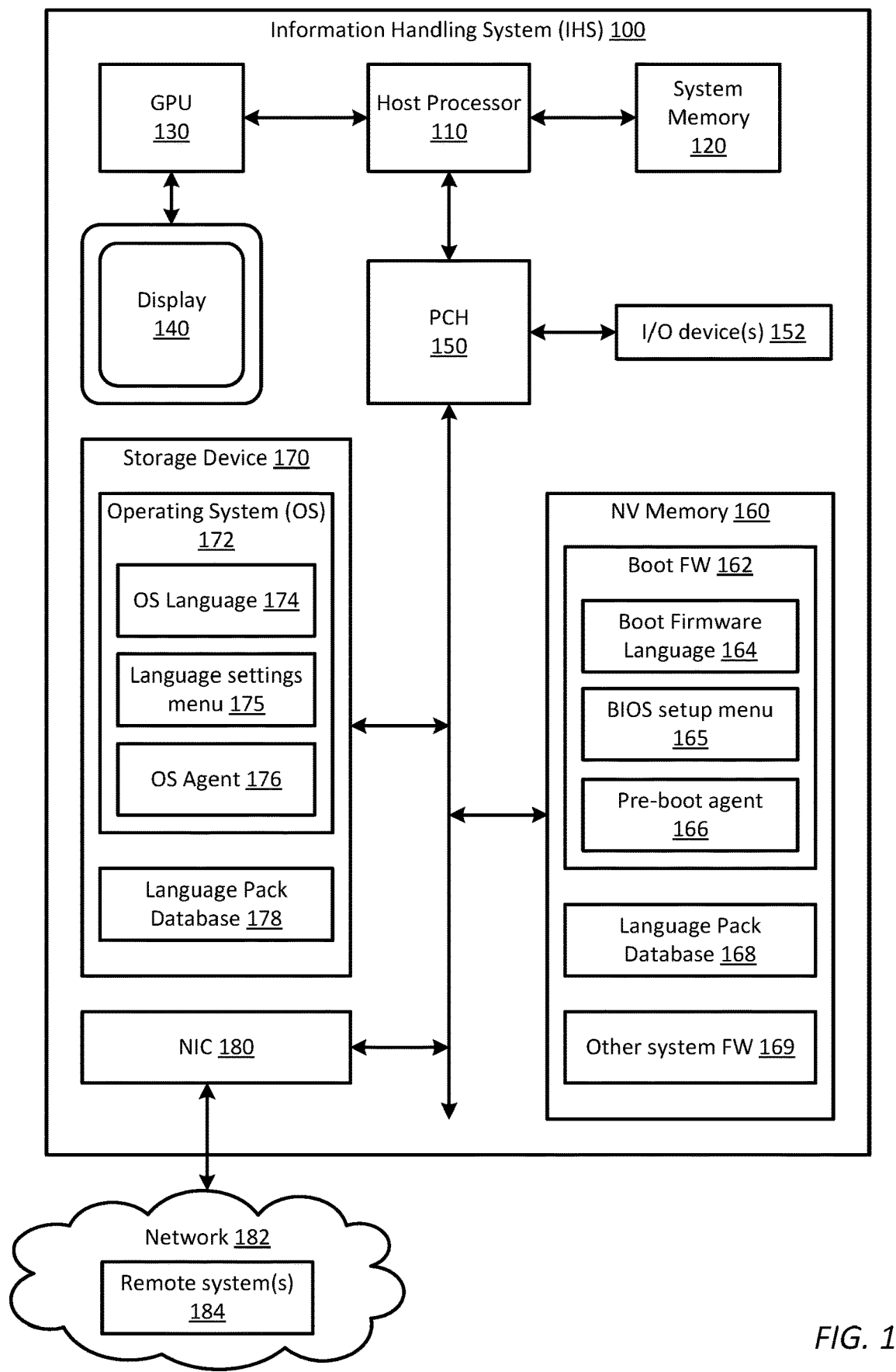
FIG. 1 is a block diagram illustrating one embodiment of an information handling system (IHS) configured to automatically change a language used in a pre-boot environment when a language change is detected in an OS environment (and vice versa)

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may generally include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

FIG. 1 is a block diagram of an information handling system 100 (e.g., a desktop computer, laptop computer, tablet computer, server, Internet of Things (IoT) device, etc.) as it may be configured according to one embodiment of the present disclosure. As shown in FIG. 1, IHS 100 may generally include at least one processing device (e.g., host processor) 110, system memory 120, graphics processor unit (GPU) 130, display device 140, platform controller hub (PCH) 150, input/output (I/O) devices 155, computer readable non-volatile (NV) memory 160, computer readable storage device 170, and network interface card (NIC) 180.

It is expressly noted that the IHS configuration shown in FIG. 1 is exemplary only, and that the methods disclosed herein may be implemented on any type and/or configuration of information handling system having one or more processing devices, a computer readable non-volatile memory, a computer readable storage device and a network interface card. It will be further understood that while certain components of the information handling system are shown in FIG. 1 for illustrating embodiments of the present disclosure, the information handling system disclosed herein is not restricted to including only those components shown in FIG. 1 and described below.

Host processor 110 may include various types of programmable integrated circuits (e.g., a processor such as a controller, microcontroller, microprocessor, ASIC, etc.) and programmable logic devices (such as a field programmable gate array "FPGA", complex programmable logic device "CPLD", etc.). According to one embodiment, host processor 110 may include at least one central processing unit (CPU) having one or more processing cores. The CPU may include any type of processing device, such as an Intel Pentium series processor, an Advanced Micro Devices (AMD) processor or another processing device.

System memory 120 is coupled to host processor 110 and generally configured to store program instructions (or computer program code), which are executable by host processor 110. System memory 120 may be implemented using any suitable memory technology, including but not limited to, random access memory (RAM), static RAM (SRAM), dynamic RAM (DRAM), synchronous dynamic RAM (SDRAM), non-volatile RAM (NVRAM), erasable programmable ROM (EPROM), electrically erasable programmable ROM (EEPROM), Flash memory, or any other type of volatile memory.

Graphics processor unit (GPU) 130 is coupled to host processor 110 and configured to coordinate communication between the host processor and one or more display components of the IHS. In the embodiment shown in FIG. 1, GPU 130 is coupled to display device 140 and configured to provide visual images to the user. In some embodiments, GPU 130 may be coupled to one or more display ports to support additional display functions. Although GPU 130 is shown as a separate processing device in the embodiment of FIG. 1, GPU 130 may be omitted in other embodiments, when the functionality provided thereby is integrated within host processor 110 in a system-on-chip (SoC) design. In some embodiments, IHS 100 may include other types of processing devices including, but not limited to, a graphics-derivative processor (such as a physics/gaming processor), a digital signal processor (DSP), and embedded controller, etc.

Platform controller hub (PCH) 150 (otherwise referred to as a southbridge controller or chipset) is coupled to host processor 110 and configured to handle I/O operations for the IHS. As such, PCH 150 may include a variety of communication interfaces and ports for communicating with various system components, such as input/output (I/O) devices 155, computer readable NV memory 160, computer readable storage device 170, and NIC 180.

I/O devices 155 enable the user to interact with IHS 100, and to interact with software/firmware executing thereon. In some embodiments, one or more I/O devices 155 may be present within, or coupled to, IHS 100. In some embodiments, I/O device(s) 155 may be separate from the IHS and may interact with the IHS through a wired or wireless connection. Examples of I/O devices 155 include, but are not limited to, keyboards, keypads, touch screens, mice, scanning devices, voice or optical recognition devices, and any other devices suitable for entering or retrieving data. In some embodiments, a user of the IHS may utilize one or more of the I/O devices 155 to change a language used in the pre-boot or OS environment.

Computer readable memory 160 may include any type of non-volatile (NV) memory including, but not limited to, read-only memory (ROM), Flash memory (e.g., SPI Flash memory) and non-volatile random-access memory (NVRAM), and may be generally configured to store software and/or firmware modules. The software and/or firmware modules stored within computer readable NV memory 160 may generally contain program instructions (or computer program code), which may be executed by host processor 110 (and/or other controllers included within the IHS) to instruct components of IHS 100 to perform various tasks and functions for the information handling system.

As shown in FIG. 1, for example, computer readable NV memory 160 may be generally configured to store boot firmware (FW) 162, a language pack database 168 and other system firmware 169. Boot firmware 162 may include software and/or firmware modules for specifying hardware configuration settings, system date/time, boot sequence, etc. In some embodiments, boot firmware 162 may be implemented as a Basic Input/Output System (BIOS) and/or a Unified Extensible Firmware Interface (UEFI). System firmware 169 may include Advanced Configuration and Power Interface (ACPI) firmware and other system firmware that may be executed by one or more controllers (e.g., an embedded controller) included within the IHS.

As known in the art, boot firmware 162 may generally include boot services and runtime services. Boot services are available for execution during the pre-boot phase (i.e., when the boot firmware owns the system platform) before the operating system (OS) is loaded and running. Examples of boot services include, but are not limited to, text and graphical consoles and user interfaces, and bus, block and file services. Runtime services are available for execution while the OS is running (i.e., during OS runtime). Examples of runtime services include, but are not limited to, date/time configuration settings and access to non-volatile memory.

In some embodiments, the boot services provided within boot firmware 162 may include one or more user interface (UI) applications, which may be executed during the pre-boot phase to display notifications or messages to the user, setup or change boot firmware settings, recover missing or corrupt firmware components, perform diagnostics, etc. Examples of pre-boot UI applications include, but are not limited to, pre-boot system messages (e.g., BIOS POST messages) and various pre-boot menus and wizards, such as BIOS Setup menu 165, the BIOS boot menu (F12), pre-boot diagnostics wizards, pre-boot firmware recovery wizards, and pre-boot password and pre-boot authentication (PBA) wizards. Each pre-boot UI application uses the same boot firmware language 164 to display visual information to the user in the pre-boot environment. The boot firmware language 164 currently used in the pre-boot environment (i.e., the active boot firmware language) may be a default language that was set during manufacturing, or a language selected by a user during the first system boot or sometime thereafter. As known in the art, a user may change the active boot firmware language 164 by accessing and manually selecting a new language in the BIOS setup menu 165.

The language pack database 168 stored within NV memory 160 provides multi-language support for boot firmware 162 and any boot services (such as, e.g., pre-boot UI applications) or runtime services that display visual information to the user. Due to the size constraints (e.g., 32 MB)

of NV memory 160, a relatively small number of language packs (e.g., about 1 to 3) may be stored within language pack database 168. In one example embodiment, language pack database 168 may be configured to store only two language packs, such as the default language pack and the alternate language pack shown in FIG. 2. Each language pack stored within language pack database 168 may include the fonts, keyboard layout, icons, animations, etc. necessary to support a given language, and may be designated by a unique language pack ID.

In some embodiments, a user may change the active boot firmware language 164 by accessing and manually selecting a new language in the BIOS setup menu 165. When a new language is selected in BIOS setup menu 165, a language pack corresponding to the new language is obtained from language pack database 168 and used to display visual information to the user in the pre-boot environment.

Computer readable storage device 170 may be any type of persistent, non-transitory computer readable storage device, such as one or more hard disk drives (HDDs) or solid-state drives (SSDs), and may be generally configured to store software and/or data. For example, computer readable storage device 170 may be generally configured to store an operating system (OS) 172 and a language pack database 178, in addition to other software modules and data. In general, OS 172 may contain program instructions (or computer program code), which may be executed by host processor 110 to perform various tasks and functions for the information handling system and/or for the user. More specifically, OS 172 may include operating system files, applications (including user interface applications), services, hardware drivers, etc., which are executed by host processor 110 during OS runtime. Although not restricted to such, OS 172 may be one of the many Windows® operating systems provided by Microsoft.

Like the boot system services mentioned above, all OS-based applications, services and drivers that display visual information to the user may use the same OS language 174 to display visual information in the OS environment. The OS language 174 currently used in the OS environment (i.e., the active OS language) may be a default language that was set during manufacturing, or a language selected by a user during the first system boot or sometime thereafter. As known in the art, a user may change the active OS language 174 by accessing and manually selecting a new language in the Language settings menu 175 of the Settings app (or Control Panel) provided, for example, in various Windows® operating systems.

The language pack database 178 stored within computer readable storage device 170 provides multi-language support for OS 172 and all OS-based applications, services and drivers that display visual information to the user. Due to the large storage capacity of computer readable storage device 170, language pack database 178 may include a relatively large number of language packs (e.g., about 7 to 10) to support a wide variety of commonly used worldwide languages (e.g., English, Spanish, French, German, Chinese, Japanese, etc.). Each language pack stored within language pack database 178 may include the fonts, keyboard layout, icons, animations, etc. necessary to support a given language, and may be designated by a unique language pack ID. Although not strictly limited to such, language pack database 178 may be stored within an EFI system partition (ESP) of computer readable storage device 170, in one embodiment.

In some embodiments, language pack database 178 may include a relatively large number of language packs (e.g., about 7 to 10) by storing the language packs in a Resource Compiler Resource Script (RCV) file, which are zipped BIOS contents stored in the ESP partition of computer readable device 170. In such embodiments, an RCV extractor can be used to securely extract a desired language pack from the RCV file stored in the ESP partition.

In some embodiments, a user may change the active OS language 174 by accessing and manually selecting a new language in the Language settings menu 175 of the Settings app (or Control Panel) provided, for example, in various Windows® operating systems. When a new language is selected in Language settings menu 175, the language pack corresponding to the newly selected language is obtained from language pack database 178 and used to display visual information to the user in the OS environment.

NIC 180 enables IHS 100 to communicate with one or more remotely located systems and/or services 184 via an external network 182 using one or more communication protocols. Network 182 may be a local area network (LAN), wide area network (WAN), personal area network (PAN), or the like, and the connection to and/or between IHS 100 and network 182 may be wired, wireless or a combination thereof. Although network 182 is indicated as a single collective component for simplicity, it is appreciated that network 182 may comprise one or more direct connections to other remotely located systems and/or services, as well as a more complex set of interconnections as can exist within a wide area network, such as the Internet.

In some embodiments, IHS 100 may utilize NIC 180 to access and retrieve additional language pack(s) from a remotely located system 184 (e.g., a network connected server, or server cloud) if a language desired by a user is not stored within language pack database 168 or language pack database 178. In some embodiments, access to the remotely located system 184 may be provided by ACPI runtime service (e.g., a Windows Platform Binary Table (WPBT) ACPI agent) executed in the OS environment. Alternatively, access to the remotely located system 184 may be provided in the pre-boot environment by utilizing the UEFI network stack.

As noted above, conventional information handling systems fail to automatically synchronize operating system and boot firmware languages when changes are made in the OS environment or the pre-boot environment. When a user changes the language used in the OS environment (e.g., changes active OS language 174), for example, the language change is not propagated to, or adopted by, the boot system components. In order to change the language used in the pre-boot environment (i.e., the active boot firmware language 164), the user must navigate through and manually select the desired language in BIOS setup menu 165. There are many problems associated with this process.

First, changing the language selection in BIOS setup menu 165 is a manual process, which many users are not entirely comfortable with. If the user does not fully understand active boot firmware language 164, the user may be unable to make the desired language change in the BIOS setup menu. Second, the number of languages available within BIOS setup menu 165 is generally limited to a relatively small number (e.g., about 1 to 3) of language packs, due to the size constraints placed upon NV memory 160. If a user desires a language, which is not supported by the small number of language packs stored within NV memory 160, a full BIOS update is generally needed to update the language packs stored therein.

To overcome the above-mentioned problems and disadvantages, the present disclosure provides various embodiments of improved information handling systems and methods to automatically synchronize operating system and boot firmware languages. As described in more detail below, some of the embodiments disclosed herein may detect a user-initiated change made to the active OS language 174, and upon the next system boot, may automatically change the active boot firmware language 164 to reflect the language change made in the OS environment. Other embodiments disclosed herein may detect a user-initiated change made to the active boot firmware language 164, and may automatically change the active OS language 174 when the OS 172 is booted to reflect the language change made in the pre-boot environment.

Figure 2:
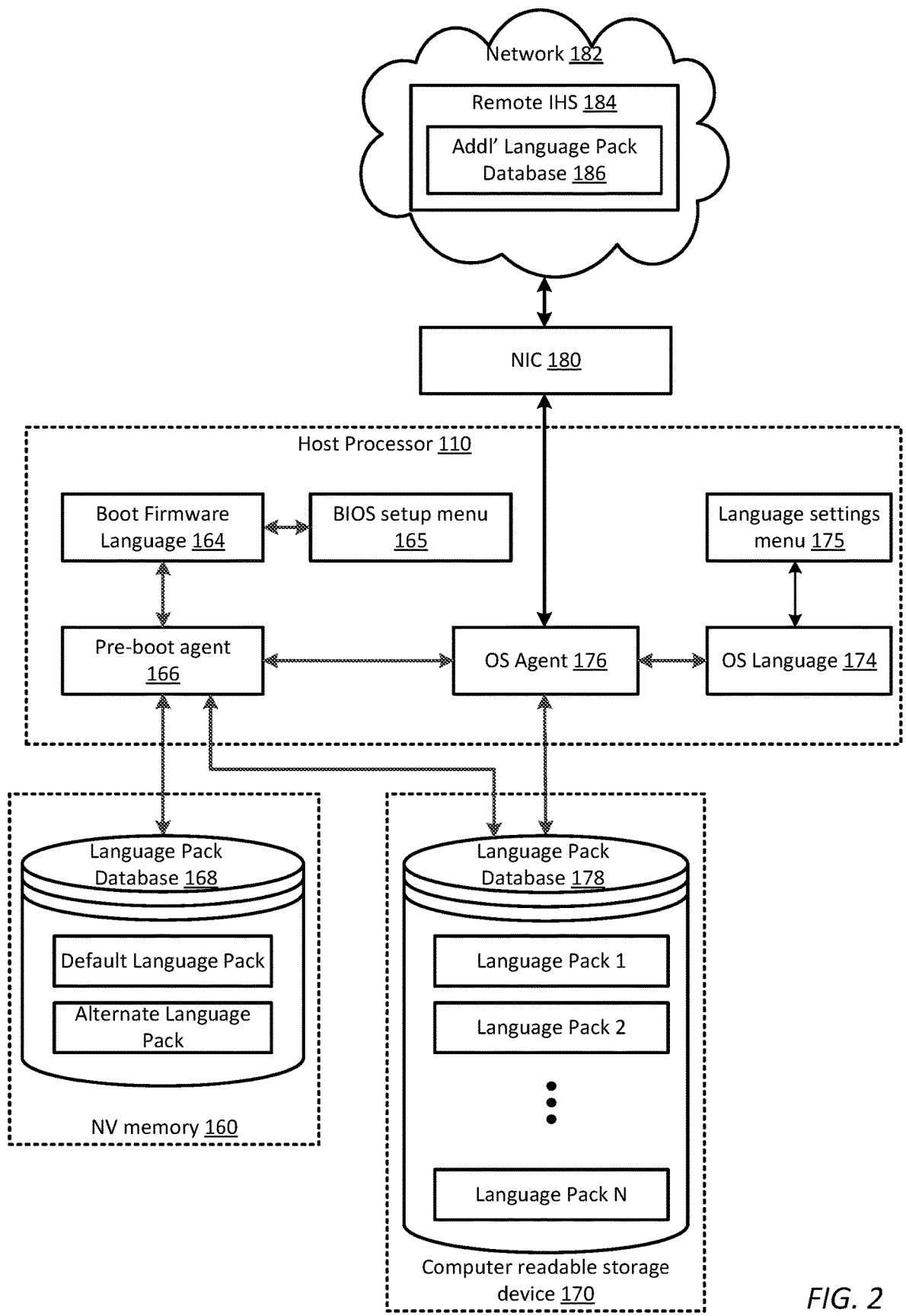
FIG. 2 is a block diagram illustrating various hardware, software and firmware components of the IHS shown in FIG. 1.

FIGS. 1 and 2 illustrate one embodiment of an improved information handling system (IHS) 100 in accordance with the present disclosure. Like conventional IHSs, IHS 100 may include a BIOS setup menu 165, which enables a user to change the active boot firmware language 164, and a language pack database 168, which is stored within NV memory 160 to provide multi-language support for boot firmware 162 and all boot and runtime services that display visual information to the user. In addition, IHS 100 may include a Language settings menu 175, which enables the user to change the active OS language 174, and a language pack database 178, which is stored within computer readable storage device 170 to provide multi-language support for OS 172 and all OS-based applications, services and drivers that display visual information to the user. Although a relatively large number of language packs (e.g., language packs 1 . . . N) may be stored within language pack database 178, a significantly smaller number of language packs (e.g., a default language pack and an alternative language pack) are stored within NV memory 160.

The IHS 100 shown in FIGS. 1 and 2 improves upon conventional IHSs by automatically synchronizing operating system and boot firmware languages. More specifically, IHS 100 includes various hardware, software and firmware components, which may be used to automatically change the language used in the pre-boot environment (i.e., the active boot firmware language 164) when a language change is detected in the OS environment (i.e., when the active OS language 174 is changed) and vice versa.

FIG. 2 illustrates the various hardware, software and firmware components that may be included within IHS 100 to automatically synchronize the operating system and boot firmware languages when a user-initiated change is made to the active OS language 174 or the active boot firmware language 164. It is noted that, while a small subset of IHS components are illustrated in FIG. 2, IHS 100 may include additional and/or alternative hardware, software and/or firmware components to implement the techniques described herein.

In addition to the components mentioned above, IHS 100 includes a pre-boot agent 166 and an OS agent 176, which can be executed by host processor 110 to automatically synchronize the operating system and boot firmware languages. Pre-boot agent 166 may be generally implemented as a boot service of boot firmware 162. In some embodiments, pre-boot agent 166 may be implemented as a driver executed during a Driver Execution Environment (DXE) phase of the boot firmware (i.e., a UEFI DXE driver). OS agent 176 may be generally implemented as an OS service or driver. In some embodiments, OS agent 176 may be implemented as an OS service, a kernel driver, a virtual driver or an ACPI runtime service (e.g., a WPBT ACPI table containing a platform executable binary). Although not restricted to such, pre-boot agent 166 may be stored within computer readable non-volatile memory 160 and OS-agent 176 may be stored within computer readable storage device 170, as shown in FIG. 1.

In some embodiments, OS-agent 176 may be executed by host processor 110 during OS runtime to detect a user-initiated change in active OS language 174 and to notify boot firmware 162 of the OS language change. As noted above, a user may change active OS language 174 by accessing and manually selecting a new language in the Language settings menu 175 of the Settings app (or Control Panel) provided, for example, in various Windows® operating systems. When a new language is selected in Language settings menu 175, OS agent 176 may access the language pack database 178 stored within computer readable storage device 170 to determine if a language pack corresponding to the newly selected language is stored therein. If a language pack corresponding to the newly selected language (e.g., Language pack 1) is stored within language pack database 178, OS agent 176 may detect the identity (e.g., the language pack ID) of the new OS language pack, and may notify boot firmware 162 that the active OS language 174 was changed.

If the language desired by the user does not correspond to one of the language packs (e.g., Language packs 1 . . . N) stored within language pack database 178, OS agent 176 may retrieve a copy of the desired language pack from an additional language pack database 186 stored, for example, within a remotely located IHS 184 (e.g., a network connected server, or server cloud). In some embodiments, OS agent 176 may use an ACPI runtime service (e.g., a WPBT ACPI agent) to retrieve a copy of the desired language pack from language pack database 186 during OS runtime. Once retrieved from the additional language pack database 186, the retrieved copy of the desired language pack may be stored within language pack database 178, so that it is available for use.

In addition to notifying boot firmware 162 that the active OS language 174 was changed, OS agent 176 may provide the identity of the language pack (e.g., the language pack ID) corresponding to the new OS language to the boot firmware. In some embodiments, OS agent 176 may notify boot firmware 162 that the active OS language 174 was changed by sending a notification message containing the language pack ID to the boot firmware. Although not restricted to such, a notification message may be sent to boot firmware 162 as a System Management Interrupt (SMI) or Windows® Management Instrumentation (WMI) message. In other embodiments, OS agent 176 may notify boot firmware 162 that the active OS language 174 was changed by storing the language pack ID as an NVRAM variable, which can be read by the boot firmware at the next system boot.

When IHS 100 is subsequently rebooted, pre-boot agent 166 may be executed by host processor 110 during the pre-boot phase to update, synchronize or change the active boot firmware language 164 to the active OS language 174 previously selected by the user. In some embodiments, active boot firmware language 164 may be automatically changed to the active OS language 174 in the pre-boot phase without any user intervention. In other embodiments, a user prompt may be displayed to notify a user of the change in the active OS language 174 and request user input as to whether the active boot firmware language 164 should be changed to reflect the language change made in the OS environment. If the user agrees to the language change, pre-boot agent 166 may change active boot firmware language 164 to the active OS language 174 previously selected by the user.

In some embodiments, pre-boot agent 166 may receive the notification message, which was sent by OS agent 176 to boot firmware 162, and may read the language pack ID contained therein to determine the identity of the language pack corresponding to the active OS language 174. In other embodiments, pre-boot agent 166 may read a language pack ID stored within an NVRAM variable upon reboot to determine the identity of the language pack corresponding to the active OS language 174. After reading the language pack ID, pre-boot agent 166 checks to see if a language pack corresponding to the language pack ID is stored within the language pack database 168 stored within NV memory 160 or the language pack database 178 stored within computer readable storage device 170.

If the language pack ID corresponds to one of the language packs (e.g., the default language pack or the alternate language pack) stored within language pack database 168, pre-boot agent 166 may change the active boot firmware language 164 to the language pack corresponding to the language pack ID, so that boot firmware 162 and boot and runtime services can use the same language pack used in the OS environment to display visual information to the user in the pre-boot environment.

If the language pack ID does not correspond to one of the language packs stored within language pack database 168, pre-boot agent 166 checks to see if the desired language pack is contained within the language pack database 178 stored within computer readable storage device 170. In some embodiments, pre-boot agent 166 may utilize an RCV extractor to read the file contents of an RCV file, which is stored within an ESP partition of computer readable storage device 170 and contains language pack database 178. If the desired language pack is found (e.g., in the RCV file), pre-boot agent 166 retrieves the language pack corresponding to the language pack ID from language pack database 178, and stores the retrieved language pack within language pack database 168 of NV memory 160. In some embodiments, pre-boot agent 166 may use the language pack retrieved from language pack database 178 to update the alternate language pack stored within language pack database 168, before selecting the alternate language pack as the active boot firmware language 164.

In the embodiments disclosed above, pre-boot agent 166 synchronizes the active boot firmware language 164 to the active OS language 174 after a user-initiated change in OS language is detected by OS agent 176. Because language synchronization is performed automatically during the next system reboot, the embodiments disclosed above eliminate the need for a user to access and manually select a boot firmware language corresponding to the new OS language in the BIOS setup menu 165. As such, the embodiments disclosed above improve the user experience by automatically maintaining a consistent language in the pre-boot and OS environments without the need for user intervention.

In other embodiments, pre-boot agent 166 may be executed by host processor 110 during a pre-boot phase to detect a user-initiated change in active boot firmware language 164 and to notify the OS 172 of the boot firmware language change. As noted above, a user may change active boot firmware language 164 by accessing and manually selecting a new language in BIOS setup menu 165. Due to size constraints of NV memory 160, the number of languages available for selection in BIOS setup menu 165 is generally limited to the small set of language packs (e.g., the default language pack and the alternate language pack) stored within language pack database 168. If a new language is selected in BIOS setup menu 165, pre-boot agent 166 may detect the identity (e.g., the language ID) of the new boot firmware language, and may notify OS 172 that the active boot firmware language 164 was changed.

In some embodiments, pre-boot agent 166 may notify OS 172 that the active boot firmware language 164 was changed by providing a WPBT ACPI table to the OS. A WPBT ACPI table includes a signed platform executable binary, which is loaded during early OS boot. In addition to executable program instructions, the platform executable binary disclosed herein may include the identity of the language pack (e.g., the language pack ID) corresponding to the active boot firmware language 164. If OS 172 detects a WPBT ACPI table during early OS boot, the OS may extract the platform executable binary from the WPBT ACPI table, and may execute the program instructions contained therein to automatically update, synchronize or change the active OS language 174 to the active boot firmware language 164 previously selected by the user in BIOS setup menu 165. More specifically, the program instructions contained within the executable binary may be executed by the host processor 110 to change the active OS language 174 to the language pack corresponding to the language pack ID, so that OS 172 and all OS-based applications, services and drivers can use the same language pack used in the pre-boot environment to display visual information to the user in the OS environment.

In the embodiments disclosed above, OS 172 synchronizes the active OS language 174 to the active boot firmware language 164 after a user-initiated change in boot firmware language is detected by pre-boot agent 166. Because language synchronization is performed automatically during early OS boot, the embodiments disclosed above eliminate the need for a user to access and manually select a language corresponding to the active boot firmware language 164 in the Language settings menu 175. As such, the embodiments disclosed above improve the user experience by maintaining a consistent language in the pre-boot and OS environments without the need for user intervention.

Figure 3:
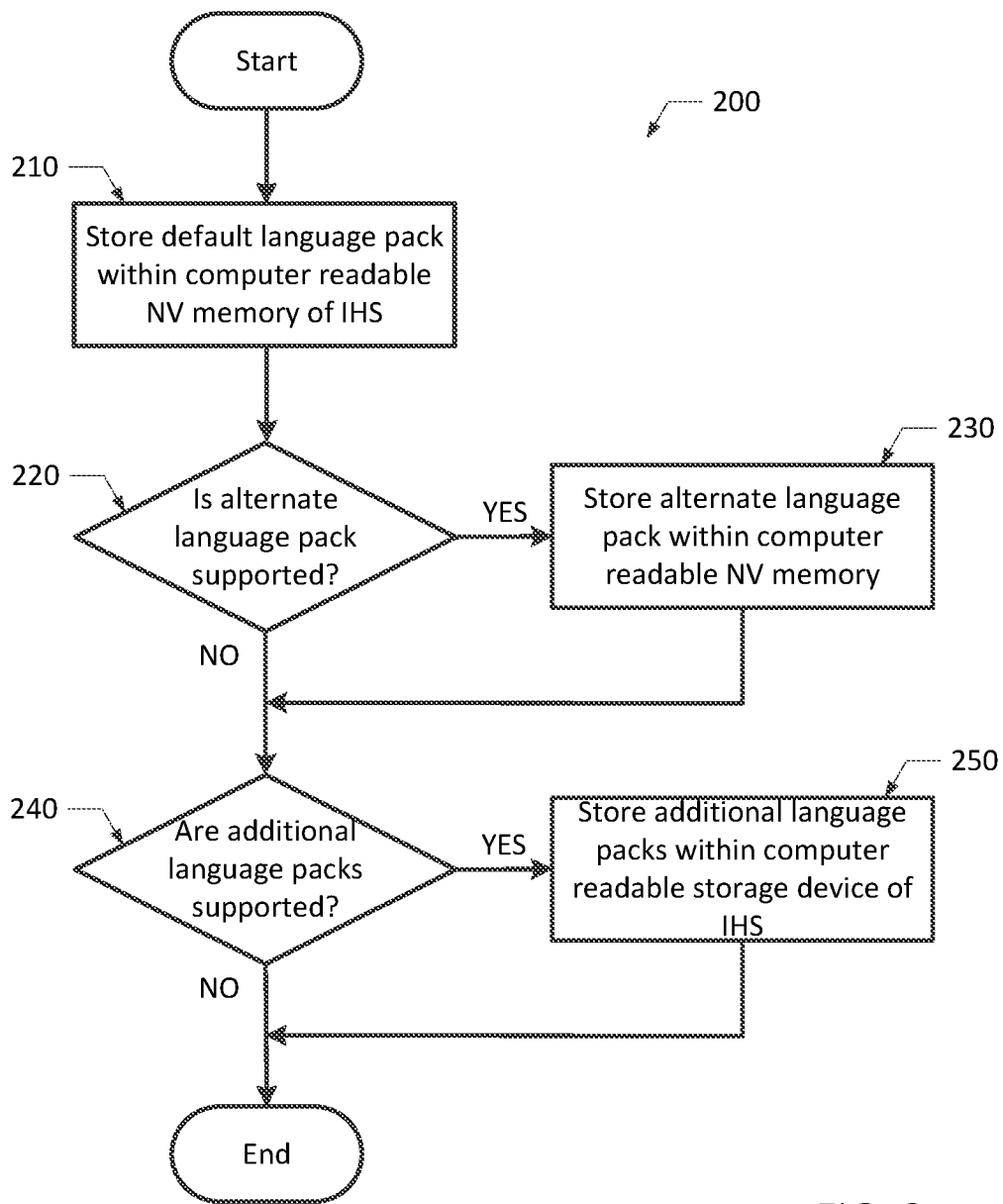
FIG. 3 is a flowchart diagram illustrating one embodiment of a method that may be performed during an initial provisioning phase to store a plurality of language packs within an information handling system.

FIGS. 3-5 illustrate various embodiments of methods in accordance with the present disclosure. FIG. 3, for example, illustrates one embodiment of a method 200 that may be performed during an initial provisioning phase to store a plurality of language packs within an information handling system. The method 200 shown in FIG. 3 may be performed during manufacturing before an information handling system is shipped to an end user.

As shown in FIG. 3, method 200 may begin (in step 210) by storing a default language pack within a computer readable non-volatile memory (e.g., NV memory 160) of an information handling system. If an alternate language pack is supported within the computer readable non-volatile memory (YES branch of step 220), the alternate language pack is stored in the computer readable non-volatile memory (in step 230). As noted above, the default language pack and/or the alternate language pack may be stored within a language pack database (e.g., language pack database 168) contained within the computer readable non-volatile memory.

If an alternate language pack is not supported within the computer readable non-volatile memory (NO branch of step 220), or if an alternative language pack is supported (YES branch of step 220) and stored within the computer readable non-volatile memory (in step 230), method 200 determines if additional language packs are supported within a computer readable storage device (e.g., computer readable storage device 170) of the information handling system (in step 240). In some embodiments, step 240 may determine if additional language packs can be stored, for example, within a language pack database 178 contained within an ESP partition of the computer readable storage device. If additional language packs are supported (YES branch of step 240), one or more additional language packs may be stored within the computer readable storage device (in step 250). Method 200 may end if additional language packs are not supported within the computer readable storage device (NO branch of step 240), or after storing the one or more additional language packs within the computer readable storage device (in step 250).

Figure 4A:
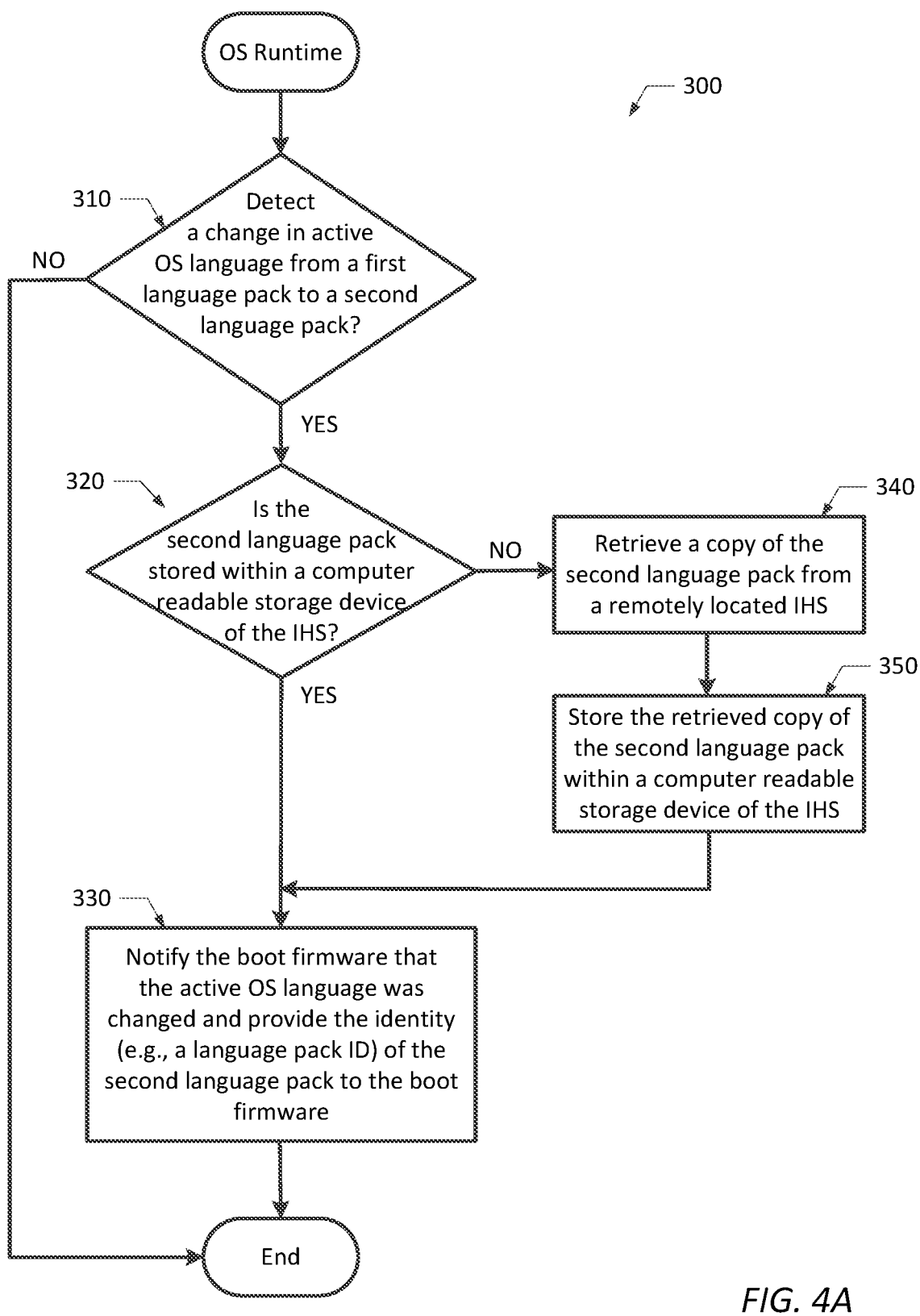
FIG. 4A is a flowchart diagram illustrating one embodiment of a method that may be performed during operating system (OS) runtime to detect a change in the active OS language and notify the boot system of the OS language change.
Figure 4B:
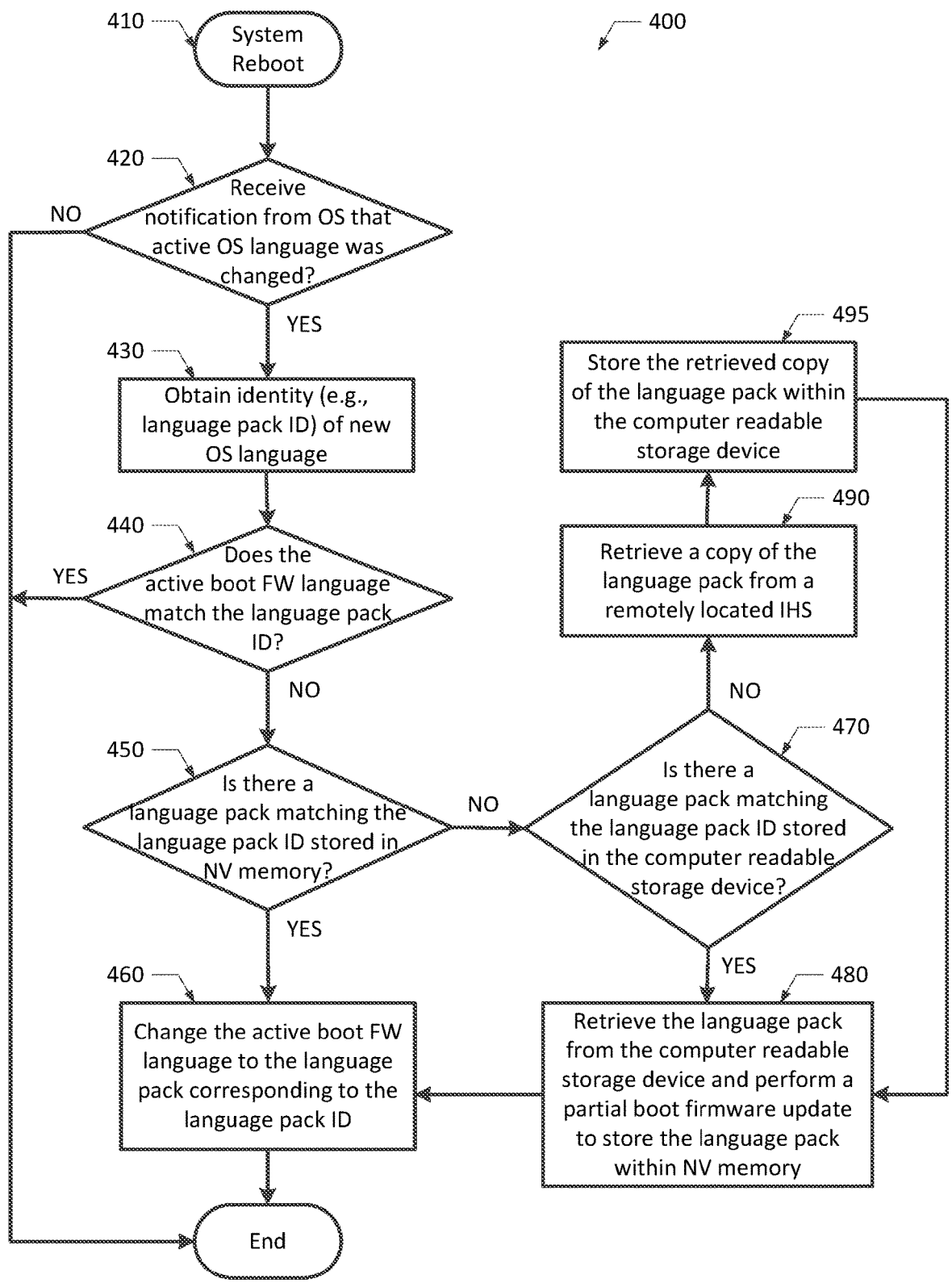
FIG. 4B is a flowchart diagram illustrating one embodiment of a method that may be performed during a subsequent system reboot to automatically synchronize the boot firmware language to the newly selected OS language.

FIGS. 4A-4B illustrate example embodiments of methods in accordance with the present disclosure, which may be used to synchronize operating system and boot firmware languages. For example, FIG. 4A illustrates one embodiment of a method 300, which may be performed during OS runtime to detect a change in the active OS language and notify the boot system of the OS language change. FIG. 4B illustrates one embodiment of a method 400, which may be performed during a subsequent system reboot to automatically synchronize the boot firmware language to the newly selected OS language.

As shown in FIG. 4A, method 300 is performed during OS runtime (e.g., via execution of OS agent 176). In some embodiments, method 300 may begin (in step 310) by detecting a change in the active OS language, for example, from a first language pack to a second language pack. As noted above, a user may change active OS language 174 by accessing and manually selecting a new OS language in the Language settings menu 175 of the Settings app (or Control Panel) provided, for example, in various Windows® operating systems. Method 300 may end, and OS runtime may continue, if a user-initiated change in the active OS language is not detected (NO branch of step 310).

If a user-initiated change is detected in the active OS language (YES branch of step 310), method 300 determine if the language pack (e.g., the second language pack) corresponding to the new OS language is stored within a computer readable storage device (e.g., computer readable storage device 170) of the IHS (in step 320). In some embodiments, method 300 may access a language pack database 178 stored within the computer readable storage device to determine (in step 320) if the language pack corresponding to the new OS language corresponds to one of the language packs (e.g., Language packs 1 . . . N) stored therein.

If the language pack (e.g., the second language pack) corresponding to the new OS language is stored within the computer readable storage device (YES branch of step 320), method 300 notifies the boot firmware that the active OS language was changed, and provides the identity (e.g., the language pack ID) of the language pack (e.g., the second language pack) to the boot firmware (in step 330).

If the language pack (e.g., the second language pack) corresponding to the new OS language is not stored within the computer readable storage device (NO branch of step 320), method 300 may attempt to retrieve a copy of the language pack from a remotely located information handling system (e.g., a network connected server, or server cloud) (in step 340). In some embodiments, method 300 may retrieve a copy of the language pack from an additional language pack database 186 contained within the remotely located IHS 184. In some embodiments, method 300 may use an ACPI runtime service (e.g., a WPBT ACPI agent) to retrieve a copy of the language pack from the remotely located IHS during OS runtime. If a copy of the language pack is successfully retrieved from the remotely located IHS, the retrieved copy of the language pack is stored within the computer readable storage device (in step 350). In some embodiments, the retrieved copy of the language pack may be stored within a language pack database 178 contained within the computer readable storage device (in step 350).

In step 330, method 300 notifies the boot firmware that the active OS language was changed, and provides the identity (e.g., the language pack ID) of the language pack (e.g., the second language pack) to the boot firmware. In some embodiments, the operating system may notify the boot firmware that the active OS language was changed by sending a notification message containing a language pack ID of the new OS language to the boot firmware, or by storing the language pack ID of the new OS language as an NVRAM variable, which can be read by the boot firmware at the next system boot. Method 300 ends once the boot firmware is notified that the active OS language was changed.

The method 400 shown in FIG. 4B is performed (e.g., via execution of pre-boot agent 166) when the information handling system is rebooted (in step 410) after the method 300 shown in FIG. 4A is performed. In step 420, method 400 determines if a notification was received from the operating system indicating that the active OS language was changed. As noted above, the operating system may notify the boot firmware that the active OS language was changed, in some embodiments, by sending a notification message containing a language pack ID of the new OS language to the boot firmware, or by storing the language pack ID of the new OS language as an NVRAM variable. If a notification is not received (NO branch of step 420), method 400 ends and the boot process continues.

If a notification is received from the operating system indicating that the active OS language was changed (YES branch of step 420), method 400 obtains the identity (e.g., the language pack ID) of the new OS language (in step 430), and determines if the active boot firmware language matches the language pack ID (in step 440). If the active boot firmware language matches the language pack ID (YES branch of step 420), method 400 ends and the boot process continues.

If the active boot firmware language does not match the language pack ID (NO branch of step 420), method 400 determines if a language pack matching the language pack ID is stored within a computer readable non-volatile memory (e.g., NV memory 160) of the IHS (in step 450). In some embodiments, method 400 may access a language pack database 168 stored within the computer readable non-volatile memory to determine (in step 350) if the language pack ID corresponds to one of the language packs (e.g., the default language pack or the alternate language pack) stored therein.

If the language pack ID corresponds to one of the language packs (e.g., the default language pack or the alternate language pack) stored within the computer readable non-volatile memory, method 400 changes the active boot firmware language to the language pack corresponding to the language pack ID (in step 460), so that the boot firmware and boot and runtime services can use the same language pack used in the OS environment to display visual information to the user in the pre-boot environment.

If the language pack ID does not correspond to one of the language packs (e.g., the default language pack or the alternate language pack) stored within the computer readable non-volatile memory, method 400 determines if a language pack matching the language pack ID is stored within a computer readable storage device (e.g., computer readable storage device 170) of the IHS (in step 470). In some embodiments, method 400 may access a language pack database 178 stored within the computer readable storage device to determine (in step 470) if the language pack ID corresponds to one of the language packs (e.g., Language packs 1 ... N) stored therein.

If the language pack ID corresponds to one of the language packs (e.g., Language packs 1 ... N) stored within the computer readable storage device (YES branch of step 470), method 400 retrieves the language pack corresponding to the language pack ID from the computer readable storage device (in step 480). In some embodiments, an RCV extractor can be used to securely extract the language pack corresponding to the language pack ID from an RCV file stored within the ESP partition of the computer readable storage device. Once the desired language pack is retrieved, method 400 performs a partial boot firmware update to store the language pack within the computer readable non-volatile memory (in step 480). In some embodiments, the partial boot firmware update may use the language pack to update the alternate language pack location within language pack database 168. In step 460, method 400 changes the active boot firmware language to the language pack corresponding to the language pack ID, so that the boot firmware and boot and runtime services can use the same language pack used in the OS environment to display visual information to the user in the pre-boot environment.

If the language pack ID does not correspond to one of the language packs stored within the computer readable non-volatile memory or the computer readable storage device (NO branch of step 470), method 400 may retrieve a copy of the language pack from a remotely located IHS (in step 490) and may store the retrieved copy of the language pack within the computer readable storage device (in step 495) before proceeding to step 480. In some embodiments, method step 490 may utilize the UEFI network stack to retrieve the copy of the language pack from the remotely located IHS in the pre-boot environment.

Figure 5A:
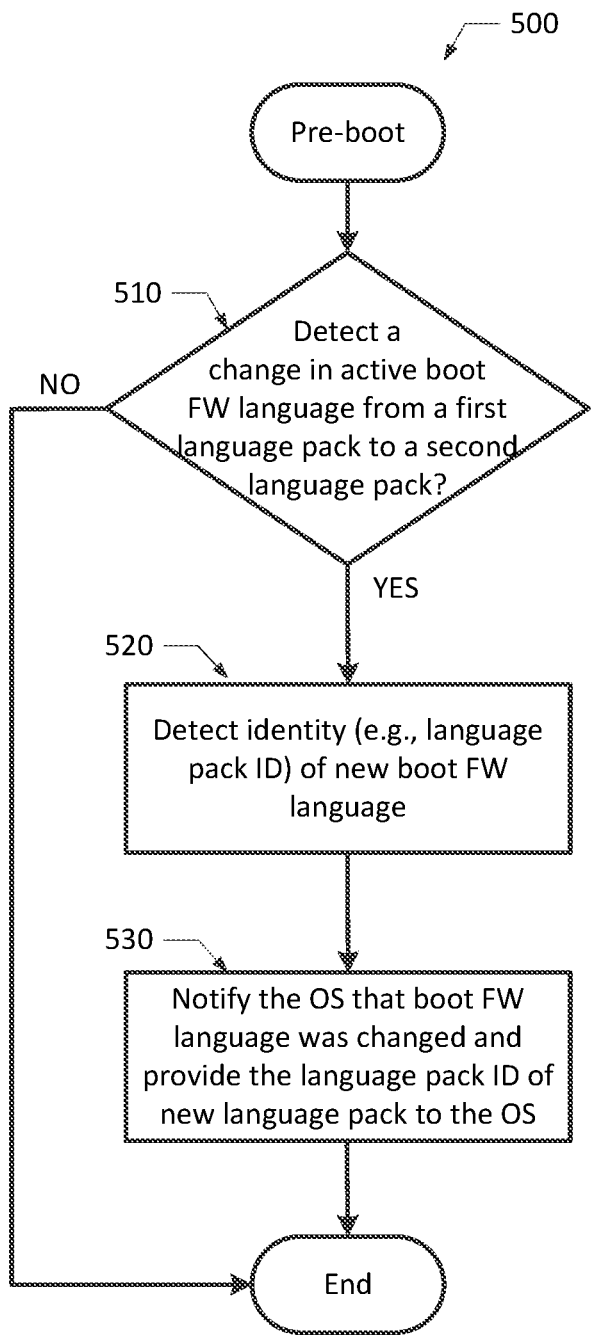
FIG. 5A is a flowchart diagram illustrating one embodiment of a method that may be performed during a pre-boot phase to detect a change in the active boot firmware language and notify the OS of the boot firmware language change.
Figure 5B:
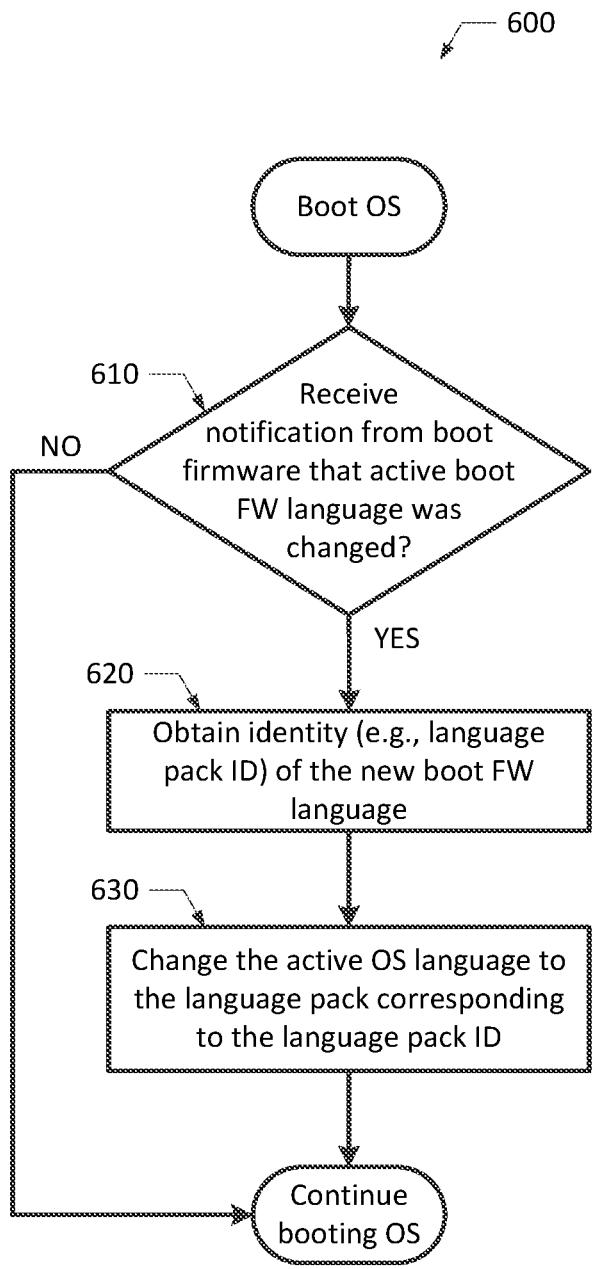
FIG. 5B is a flowchart diagram illustrating one embodiment of a method that may be performed when the OS is subsequently booted to automatically synchronize the OS language to the newly selected boot firmware language.

FIGS. 5A-5B illustrate alternative embodiments of methods in accordance with the present disclosure, which may be used to synchronize operating system and boot firmware languages. For example, FIG. 5A illustrates an alternative embodiment of a method 500, which may be performed during a pre-boot phase to detect a change in the active boot firmware language and notify the OS of the boot firmware language change. FIG. 5B illustrates an alternative embodiment of a method 600, which may be performed when the OS is subsequently booted to automatically synchronize the OS language to the newly selected boot firmware language.

As shown in FIG. 5A, method 500 is performed during a pre-boot phase (e.g., via execution of pre-boot agent 166) when the information handling system is powered on or booted. In some embodiments, method 500 may begin (in step 510) by detecting a change in the active boot firmware language, for example, from a first language pack to a second language pack. As noted above, a user may change active boot firmware language 164 by accessing and manually selecting a new language in BIOS setup menu 165. Method 400 may end, and the boot process may continue, if a user-initiated change in the active boot firmware language is not detected (NO branch of step 510).

If a user-initiated change is detected in the active boot firmware language (YES branch of step 510), method 500 detects the identity (e.g., the language pack ID) of the new boot firmware language (in step 520), notifies the operating system that the active boot firmware language was changed and provides the identity (e.g., the language pack ID) of the new boot firmware language to the OS (in step 530). In some embodiments, method 500 may notify the operating system that the active boot firmware language was changed (in step 530) by creating and storing a WPBT ACPI table, which includes a signed platform executable binary containing program instructions and the identity of the language pack (e.g., the language pack ID) corresponding to the active boot firmware language. Once the OS is notified of the change in boot firmware language (in step 530), method 500 may end and the boot process may continue.

The method 600 shown in FIG. 5B is performed by the operating system during early OS boot after the method 500 shown in FIG. 5A is performed. In step 610, method 600 determines if a notification was received from the boot firmware indicating that the active boot firmware language was changed. If a notification is received (YES branch of step 610), method 600 obtains the identity (e.g., the language pack ID) of the active system boot firmware language (in step 620) and changes the active OS language to the language pack corresponding to the language pack ID (in step 630). Otherwise, method 600 may continue booting the OS.

As noted above, some embodiments of method 500 may notify the operating system that the active boot firmware language was changed (in step 530) by creating and storing a WPBT ACPI table containing a signed platform executable binary and a language pack ID corresponding to the new boot firmware language. In some embodiments of method 600, the operating system may check for WPBT ACPI tables during early OS boot to determine (in step 610) if a notification was received from the boot firmware that the active boot firmware language was changed. If a WPBT ACPI table is not detected (NO branch of step 610), method 600 may continue booting the OS. However, if a WPBT ACPI table is detected (YES branch of step 610), method 600 automatically executes the platform executable binary contained within the WPBT ACPI table (after performing signature verification) to change the active OS language to the language pack corresponding to the language pack ID obtained in step 620, so that the operating system and all OS-based applications, services and drivers can use the same language pack used in the pre-boot environment to display visual information to the user in the OS environment. Once the active OS language is changed (in step 620), method 600 may continue OS booting.

It will be understood that one or more of the tasks, functions, or methodologies described herein may be implemented, for example, as firmware or as a computer program of instructions embodied in a non-transitory tangible computer readable medium that is executed by a CPU, embedded controller, microcontroller, processor, microprocessor, FPGA, ASIC, or other suitable processing device.

For example, the methods shown in FIGS. 4A-4B and 5A-5B are computer implemented methods performed, at least in part, by a processing device (e.g., host processor 110) of an information handling system (e.g., IHS 100). According to one example implementation, host processor 110 may perform the method steps shown in FIGS. 4A-4B and 5A-5B by executing program instructions stored within computer readable storage device 170 (such as, e.g., program instructions contained within OS 172, and OS agent 176) and computer readable NV memory 160 (such as, e.g., program instructions contained within pre-boot agent 166). Unlike conventional information handling systems, the computer implemented methods shown in FIGS. 4A-4B and 5A-5B improve the way in which an information handling system functions, in at least one respect, by automatically synchronizing the operating system and boot firmware languages when changes are made to the active OS language or the active boot firmware language.

More specifically, the systems and computer-implemented methods described herein improve upon conventional handling system functions by automatically changing the active boot firmware language to the active OS language after a user-initiated change in OS system language is detected (and vice versa). Because language synchronization is performed automatically, the embodiments disclosed herein eliminate the need for a user to access and manually select a new language in the BIOS setup menu 165 (or in the Language settings menu 175). As such, the embodiments disclosed herein improve user experience by maintaining a consistent language in the pre-boot and OS environments without the need for user intervention. By maintaining a consistent language in the pre-boot and OS environments, the embodiments disclosed herein ensure that a user will be able to understand the language used by various pre-boot UI applications (such as, e.g., BIOS POST messages, BIOS setup and boot menus, pre-boot diagnostics wizards, pre-boot firmware recovery wizards, pre-boot password and pre-boot authentication wizards) even if the computer readable storage device 170 fails, rendering OS 172 inoperable.

In addition to automatically synchronizing OS and boot firmware languages, the systems and computer-implemented methods described herein improve upon conventional information handling systems by providing the boot firmware with virtually unlimited language support. Unlike conventional information handling systems, the multi-language support provided herein to boot firmware 162 is not limited by the size of computer readable NV memory 160 (e.g., an SPI Flash) or the language packs initially stored within the computer readable NV memory at the factory. If a language pack corresponding to a user-selected OS language is not stored within computer readable NV memory 160, the embodiments disclosed herein may download the desired language pack from a remotely located IHS 184 and/or copy the desired language pack from computer readable storage device 170 to NV memory 160. Accordingly, the embodiments disclosed herein may be used to provide virtually unlimited language support to boot firmware 162 without performing a full BIOS update or increasing the size of the BIOS image.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus, the invention is not limited to only those combinations shown herein, but rather may include other combinations.

What is claimed is:

1. An information handling system (IHS), comprising:
a computer readable non-volatile memory configured to store boot firmware, a first language pack database containing a relatively small number of language packs configured to provide multi-language support for the boot firmware, wherein one of the language packs within the first language pack database is selected as an active boot firmware language, which is used to display visual information to a user in a pre-boot environment, and a pre-boot agent;
a computer readable storage device configured to store an operating system (OS), a second language pack database containing a relatively large number of language packs configured to provide multi-language support for the OS, wherein one of the language packs within the second language pack database is selected as an active OS language, which is used to display visual information to the user in an OS environment, and an OS agent; and
a processing device configured to:
execute the OS agent during OS runtime to detect a change in the active OS language and notify the boot firmware that the active OS language was changed; and
execute the pre-boot agent when the IHS is subsequently rebooted to synchronize the active boot firmware language to the active OS language.

2. An information handling system (IHS), comprising:
a computer readable non-volatile memory configured to store boot firmware, a language pack database containing a relatively small number of language packs configured to provide multi-language support for the boot firmware, and a pre-boost agent;
a computer readable storage device configured to store an operating system (OS), a language pack database containing a relatively large number of language packs configured to provide multi-language support for the OS, and an OS agent; and
a processing device configured to:
execute the OS agent during OS runtime to detect a change in an active OS language and notify the boot firmware that the active OS language was changed; and
execute the pre-boot agent when the IHS is subsequently rebooted to synchronize an active boot firmware language to the active OS language;
wherein the processing device is configured to execute the OS agent during OS runtime to:
detect a change in the active OS language from a first language pack to a second language pack; and
provide an identity of the second language pack to the boot firmware.

3. The information handling system as recited in claim 2, wherein if the second language pack is not contained within the language pack database stored within the computer readable storage device, the processing device is further configured to execute the OS agent to:
retrieve a copy of the second language pack from a remotely located system; and
store the retrieved copy of the second language pack within the computer readable storage device.

4. The information handling system as recited in claim 2, wherein to notify the boot firmware that the active OS language was changed, the processing device executes the OS agent to:
send a notification message containing the identity of the second language pack to the boot firmware; or
store the identity of the second language pack as a non-volatile memory variable, which is read by the boot firmware at the next system boot.

5. The information handling system as recited in claim 2, wherein if the boot firmware receives notification that the active OS language was changed, the processing device is configured to execute the pre-boot agent to:
obtain the identity of the second language pack; and
determine if the active boot firmware language matches the identity of the second language pack.

6. The information handling system as recited in claim 5, wherein if the active boot firmware language does not match the identity of the second language pack, the processing device is configured to execute the pre-boot agent to:
   determine if a language pack matching the identity of the second language pack is contained within the language pack database stored within the computer readable non-volatile memory or the language pack database stored within the computer readable storage device.

7. The information handling system as recited in claim 6, wherein if a language pack matching the identity of the second language pack is contained within the language pack database stored within the computer readable non-volatile memory, the processing device is configured to execute the pre-boot agent to:
   change the active boot firmware language to the language pack matching the identity of the second language pack.

8. The information handling system as recited in claim 6, wherein if a language pack matching the identity of the second language pack is not contained within the language pack database stored within the computer readable non-volatile memory but is contained with the language pack database stored within the computer readable storage device, the processing device is configured to execute the pre-boot agent to:
   perform a partial boot firmware update to copy the language pack from the computer readable storage device to the language pack database stored within the computer readable non-volatile memory; and
   change the active boot firmware language to the language pack matching the identity of the second language pack.

9. An information handling system (IHS), comprising:
   a computer readable non-volatile memory configured to store boot firmware, a first language pack database containing a relatively small number of language packs configured to provide multi-language support for the boot firmware, wherein one of the language packs within the first language pack database is selected as an active boot firmware language, which is used to display visual information to a user in a pre-boot environment, and a pre-boost agent;
   a computer readable storage device configured to store an operating system (OS), a second language pack database containing a relatively large number of language packs configured to provide multi-language support for the OS, wherein one of the language packs within the second language pack database is selected as an active OS language, which is used to display visual information to the user in an OS environment, and an OS agent; and
   a processing device configured to:
      execute the pre-boot agent during a pre-boot phase to detect a change in the active boot firmware language and notify the OS that the active boot firmware language was changed; and
      execute the OS agent when the OS is subsequently booted to synchronize the active OS language to the active boot firmware language.

10. An information handling system (IHS), comprising:
   a computer readable non-volatile memory configured to store boot firmware, a language pack database containing a relatively small number of language packs configured to provide multi-language support for the boot firmware, and a pre-boost agent;
   a computer readable storage device configured to store an operating system (OS), a language pack database containing a relatively large number of language packs configured to provide multi-language support for the OS, and an OS agent; and
   a processing device configured to:
      execute the OS agent during OS runtime to detect a change in an active OS language and notify the boot firmware that the active OS language was changed; and
      execute the pre-boot agent when the IHS is subsequently rebooted to synchronize an active boot firmware language to the active OS language;
   wherein the processing device is further configured to:
      execute the pre-boot agent during a pre-boot phase to detect a change in the active boot firmware language and notify the OS that the active boot firmware language was changed; and
      execute the OS agent when the OS is subsequently booted to synchronize the active OS language to the active boot firmware language; and
   wherein the processing deice is configured to execute the pre-boot agent to:
      detect a change in the active boot firmware language from a first language pack to a second language pack; and
      provide an identity of the second language pack to the OS.

11. An information handling system (IHS), comprising:
   a computer readable non-volatile memory configured to store boot firmware, a language pack database containing a relatively small number of language packs configured to provide multi-language support for the boot firmware, and a pre-boost agent;
   a computer readable storage device configured to store an operating system (OS), a language pack database containing a relatively large number of language packs configured to provide multi-language support for the OS, and an OS agent; and
   a processing device configured to:
      execute the OS agent during OS runtime to detect a change in an active OS language and notify the boot firmware that the active OS language was changed; and
      execute the pre-boot agent when the IHS is subsequently rebooted to synchronize an active boot firmware language to the active OS language;
   wherein the processing device is further configured to:
      execute the pre-boot agent during a pre-boot phase to detect a change in the active boot firmware language and notify the OS that the active boot firmware language was changed; and
      execute the OS agent when the OS is subsequently booted to synchronize the active OS language to the active boot firmware language; and
   wherein to notify the OS that the active boot firmware language was changed, the processing device executes the pre-boot agent to:
      create and store a Windows Platform Binary Table (WPBT) Advanced Configuration and Power Interface (ACPI) table containing a signed platform executable binary and the identity of the second language pack.

12. The information handling system as recited in claim 11, wherein if the OS receives notification that the active boot firmware language was changed, the processing device executes the signed platform executable binary to:

obtain the identity of the second language pack; and change the active OS language to a language pack matching the identity of the second language pack.

13. A computer-implemented method performed by a processing device of an information handling system (IHS) to synchronize operating system (OS) and boot firmware languages, the computer-implemented method comprising:

detecting a change in an active OS language from a first language pack to a second language pack during OS runtime;

notifying boot firmware that the active OS language was changed;

providing an identity of the second language pack to the boot firmware; and synchronizing an active boot firmware language to the active OS language when the IHS is subsequently rebooted.

14. The computer-implemented method as recited in claim 13, wherein prior to notifying the boot firmware that the active OS language was changed, the computer-implemented method further comprises:

determining if the second language pack is stored within a computer readable storage device of the IHS, wherein if the second language pack is not stored within the computer readable storage device, the computer-implemented method further comprises:

retrieving a copy of the second language pack from a remotely located system; and storing the retrieved copy of the second language pack within the computer readable storage device.

15. A computer-implemented method performed by a processing device of an information handling system (IHS) to synchronize operating system (OS) and boot firmware languages, the computer-implemented method comprising:

detecting a change in an active OS language from a first language pack to a second language pack during OS runtime;

notifying boot firmware that the active OS language was changed;

providing an identity of the second language pack to the boot firmware; and synchronizing an active boot firmware language to the active OS language when the IHS is subsequently rebooted;

wherein said synchronizing the active boot firmware language to the active OS language comprises:

obtaining the identity of the second language pack; and determining if the active boot firmware language matches the identity of the second language pack.

16. The computer-implemented method as recited in claim 15, wherein if the active boot firmware language does not match the identity of the second language pack, the computer-implemented method further comprises:

determining if a language pack matching the identity of the second language pack is stored within a computer readable non-volatile memory or a computer readable storage device of the IHS.

17. The computer-implemented method as recited in claim 16, wherein if a language pack matching the identity of the second language pack is stored with the computer readable non-volatile memory, the computer-implemented method further comprises:

changing the active boot firmware language to the language pack matching the identity of the second language pack.

18. The computer-implemented method as recited in claim 16, wherein if a language pack matching the identity of the second language pack is not stored within the computer readable non-volatile memory but is stored within the computer readable storage device, the computer-implemented method further comprises:

performing a partial boot firmware update to copy the language pack from the computer readable storage device to the computer readable non-volatile memory; and changing the active boot firmware language to the language pack matching the identity of the second language pack.

19. A computer-implemented method performed by a processing device of an information handling system (IHS) to synchronize operating system (OS) and boot firmware languages, the computer-implemented method comprising:

detecting a change in an active boot firmware language from a first language pack to a second language pack during a pre-boot phase;

notifying the OS that the active boot firmware language was changed;

providing an identity of the second language pack to the OS; and synchronizing an active OS language to the active boot firmware language when the OS is subsequently booted.

20. A computer-implemented method performed by a processing device of an information handling system (IHS) to synchronize operating system (OS) and boot firmware languages, the computer-implemented method comprising:

detecting a change in an active boot firmware language from a first language pack to a second language pack during a pre-boot phase;

notifying the OS that the active boot firmware language was changed;

providing an identity of the second language pack to the OS; and synchronizing an active OS language to the active boot firmware language when the OS is subsequently rebooted;

wherein said notifying the OS that the active boot firmware language was changed comprises:

creating and storing a Windows Platform Binary Table (WPBT) Advanced Configuration and Power Interface (ACPI) table containing a signed platform executable binary and the identity of the second language pack.

21. The computer-implemented method as recited in claim 20, wherein said synchronizing the active OS language to the active boot firmware language comprising:

obtaining the identity of the second language pack; and changing the active OS language to a language pack matching the identity of the second language pack.

* * * * *